H. J. HICK.
FEED DEVICE FOR SAW AND LIKE MACHINES.
APPLICATION FILED AUG. 21, 1908.

940,016.

Patented Nov. 16, 1909.

2 SHEETS—SHEET 1.

Witnesses:
J. C. Turner
Jno. F. Oberlin

Inventor:
Harry J. Hicks,
by J. B. Fay
Attorney.

H. J. HICK.
FEED DEVICE FOR SAW AND LIKE MACHINES.
APPLICATION FILED AUG. 21, 1908.
940,016.
Patented Nov. 16, 1909.
2 SHEETS—SHEET 2.
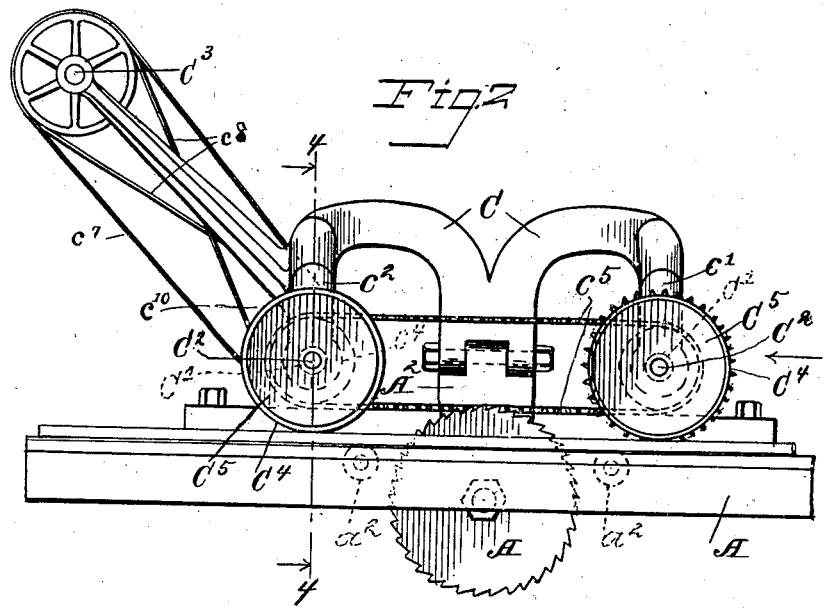
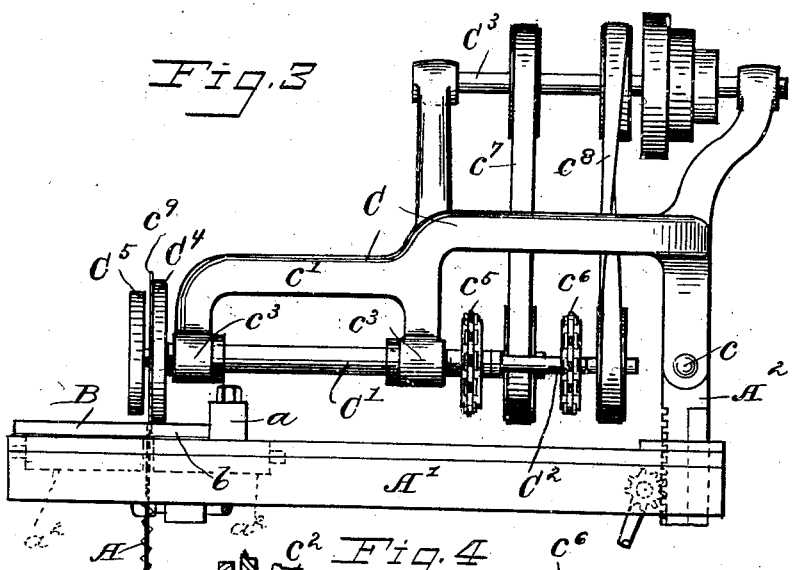
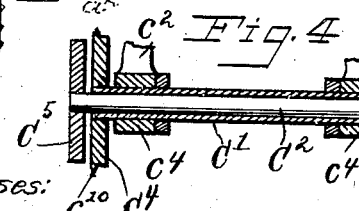
Witnesses:
Inventor:
Harry J. Hick,
by J. B. Fay
Attorney.

UNITED STATES PATENT OFFICE.

HARRY J. HICK, OF ALLIANCE, OHIO.

FEED DEVICE FOR SAW AND LIKE MACHINES.

940,016.        Specification of Letters Patent.        Patented Nov. 16, 1909.

Application filed August 21, 1908. Serial No. 449,616.

*To all whom it may concern:*

Be it known that I, HARRY J. HICK, a citizen of the United States, resident of Alliance, county of Stark, and State of Ohio, have invented a new and useful Improvement in Feed Devices for Saw and Like Machines, of which the following is a specification, the principle of the invention being herein explained and the best mode in which I have contemplated applying that principle, so as to distinguish it from other inventions.

My present invention, relating as indicated to feed mechanism, has as its object the provision of a device of this general description particularly adapted for use in connection with saws and other like wood or metal working machines wherein it is desirable to alternately advance and retract the stock being operated upon. Thus in the case of sawing strips from a larger stick of timber, or board, as by a rip saw, the stick requires to be advanced past the saw, until the strip has been severed therefrom, and then be returned again for a repetition of the operation until the entire stick has been used up.

The object of the present invention is the provision of a device of this sort wherein such advance and retraction of the stock may be automatically had.

To the accomplishment of the foregoing and related ends, said invention, then, consists of the means hereinafter fully described and particularly set forth in the claims.

The annexed drawings and the following description set forth in detail certain mechanism embodying the invention, such disclosed means constituting, however, but one of various mechanical forms in which the principle of the invention may be used.

Figure 1:
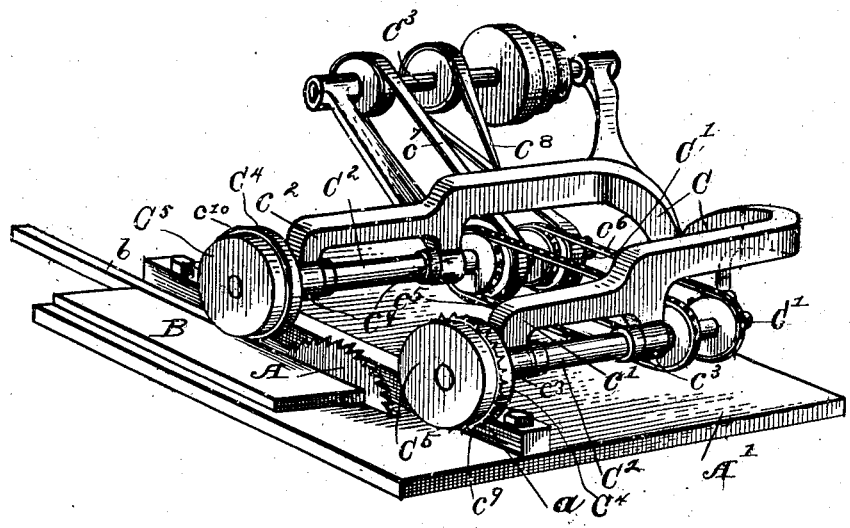

In said annexed drawings: Figure 1 is a perspective view of an approved form of my invention as applied to a circular rip-saw; Fig. 2 is a front elevation of the same; Fig. 3 is an end elevation thereof; Fig. 4 a broken section on the line 4—4, Fig. 2; and Fig. 5 a diagrammatic plan view of the arrangement of my feed device on the saw table.

It will be understood that in the above drawings and the following description pertaining thereto, the circular saw is illustrative merely, for, as will be obvious, in place thereof a band-saw or in fact any other suitable tool may be used without affecting the relation or operation of my feed mechanism to such tool. The aforesaid saw A, then, is suitably mounted in the frame of the supporting table A' upon which the stock is fed past the saw. Upon said table as usual there is provided an adjustable guide $a$ disposed parallel with the direction in which the stock is designed to move, and by its adjustability adapted to variously gage the width of the strips $b$ being cut off from the piece of timber B that constitutes the stock in the present instance. Laterally of the table A', thus seen to form the stock-supporting means, is provided a vertically adjustable support $A^2$ upon which is pivotally mounted about an axis $c$ parallel with the path of movement of the stock, a frame C, the forward, free, end of which extends over such path. Specifically the frame C comprises two arms $c'$ $c^2$ extending over the path of the stock, in each of which arms is mounted about a common axis transverse to such path two shafts, C' $C^2$, one within the other, said arms being provided with suitable bearings $c^3$ $c^3$, $c^4$ $c^4$, for sustaining such shafts, as shown, see Fig. 4.

The disposition of arms $c'$ $c^2$ is such that the one lies in the rear, the other to the front of the saw, A', Figs. 1 and 2. The rear ends of corresponding shafts of each pair are connected by sprocket gearing $c^5$ $c^6$, and the shafts of one pair are respectively connected with a suitable countershaft $C^3$ by belts $c^7$ $c^8$ in such fashion that the inner shaft will be driven in a reverse direction to that in which the outer shaft is driven. Upon the outer ends of each pair of shafts C' $C^2$ are respectively mounted feed rolls $C^4$ $C^5$ disposed so as to lie one on either side of the line of the saw. The inner roll $C^4$ of each pair is of slightly larger diameter than the outer roll so that when the stick is being fed forward it, alone, will contact therewith, the outer roll being held entirely out of such contact; and the foremost of said two larger rolls $C^4$, having regard to the direction of feed, is furthermore provided with the usual spur teeth $c^9$ for guiding the saw, while the rearmost has a splitter $c^{10}$ for operating in the kerf.

From the foregoing construction it will be obvious that a board or similar piece B of timber from which successive strips are to be severed will be taken up by the foremost advancing feed roll C⁴ and fed into the saw, the second advancing roll serving to carry such stock piece of timber entirely past the saw until, in other words, the strip *b* of width determined by guide *a*, has been severed therefrom. The moment such strip is separated from the stock the latter will cease, of course, to advance and when the strip has been fed entirely past such second advancing roll the frame will be allowed to drop through a distance equal to the slight difference in radii between the inner and outer rolls. The latter now contact with the stock, which will be retracted, owing to the opposite direction of rotation of such roll. In the first instance the rearmost retracting roll alone thus contacts with the stock, but the foremost one also picks it up and returns it to its initial or starting place.

Figure 5:
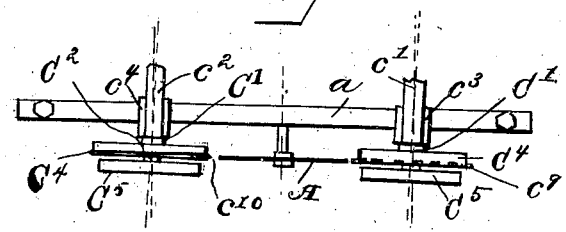

The rolls C⁴ C⁵ are preferably not strictly parallel with the line of the saw, but as shown in Fig. 5, are turned in a trifle toward the adjustable guide *a*. This arrangement serves the double purpose of keeping the fed material crowded toward the guide pending its advance, and for displacing the material away from the saw pending its return. To facilitate the movement of the material across the supporting table A, rolls $a^2$, disposed in the usual way, are provided, such rolls being divided, however, on the line of the saw, since they may at times have to rotate in opposite directions.

It has not been deemed necessary to illustrate and describe the adaptation of my improved stock feeding device to more than one type of machine, or saw, since it is believed the arrangement herein disclosed will readily suggest how the device may be employed with band saws, saws operating horizontally or at an inclined angle instead of vertically, and, indeed with machines of other character than saws, altogether. The operative advantages of such device, likewise do not require to be pointed out, the simplicity in operation and saving in time and labor being obvious.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In mechanism of the class described, the combination with stock-supporting means, of feed members mounted so as to be conjointly movable toward and from said supporting means, said members moving in opposite directions to advance and retract the stock, respectively, when in contact therewith, one such member being located nearer said supporting means than the other, whereby the latter is retained out of contact with the stock when the former is in such contact.

2. In feed mechanism for saws and the like, the combination with stock-supporting means, of feed members mounted so as to be conjointly movable toward and from said supporting means, said members being respectively located on opposite sides of the plane of the saw and moving in opposite directions to advance and retract the stock, when in contact therewith, one such member being mounted nearer said supporting means than the other, whereby the latter is retained out of contact with the stock when the former is in such contact.

3. In feed mechanism for saws and the like, the combination with stock-supporting means, two similar pairs of feed members mounted so as to be conjointly movable toward and from said supporting means, one pair in front and the other to the rear of the saw, the members of each pair moving in opposite directions to advance and retract the stock, respectively, when in contact therewith, the set of members for advancing the stock being mounted nearer said supporting means than the other set, whereby the latter set is retained out of contact with the stock when the former is in such contact.

4. In mechanism of the class described, the combination of stock-supporting means, a frame movable toward and from the same, and feed members borne by said frame and moving in opposite directions to advance and retract the stock, respectively, when in contact therewith, one such feed member being located nearer said supporting means than the other, whereby the latter is retained out of contact with the stock when the former is in such contact.

5. In feed mechanism for saws and the like, the combination of stock-supporting means, a frame movable toward and from the same, and feed members borne by said frame, said members being respectively located on opposite sides of the plane of the saw and moving in opposite directions to advance and retract the stock when in contact therewith, the stock-advancing member being carried nearer said stock-supporting means than the other member, whereby the latter is retained out of contact with the stock when the former is in such contact.

6. In feed mechanism for saws and the like, the combination of stock-supporting means, a frame movable toward and from the same, and two similar pairs of feed members borne by said frame, one pair in front and the other to the rear of the saw, corresponding members of the two pairs lying on the same side of the plane of the saw and the members on opposite sides of such saw moving in opposite directions to advance and retract the stock, respectively, when in contact therewith, the set of members for advancing the stock being mounted nearer said supporting means than the other, whereby the latter set is retained out of contact with the stock when the former is in such contact.

7. In mechanism of the class described, the combination of stock-supporting means, a frame movable toward and from the same, and feed rolls borne by said frame, and rotating in opposite directions to advance and retract the stock, respectively, when in contact therewith, one roll being located nearer said supporting means than the other, whereby the latter is retained out of contact with the stock when the former is in such contact.

8. In mechanism of the class described, the combination of stock-supporting means, a frame oscillatory about an axis parallel with the path of movement of the stock, a pair of feed rolls mounted in said frame over such path, and rotatable about axes transverse thereto, and means for rotating said rolls in opposite directions, one roll being located nearer said supporting means than the other, whereby the latter is retained out of contact with the stock when the former is in such contact.

9. In mechanism of the class described, the combination of stock-supporting means, a guide member, a frame oscillatory about an axis parallel with the path of movement of the stock, a pair of rolls mounted in said frame over such path and rotatable about axes transverse thereto, and means for rotating said rolls in opposite directions, the roll nearer said guide member being also located nearer said supporting means than the other, whereby the latter is retained out of contact with the stock when the former is in such contact.

10. In mechanism of the class described, the combination of stock-supporting means, a frame oscillatory about an axis parallel with the path of movemnt of the stock, two pairs of feed rolls mounted in said frame over such path, each pair being rotatable about a common axis transverse to such path and means for rotating corresponding rolls of said pairs in one direction and the others in the opposite direction, the first-named rolls being of larger diameter than the last-named, whereby the latter are retained out of contact with the stock when the former is in such contact.

11. In feed mechanism for a saw, the combination of a stock-supporting table, a guide thereon, a frame oscillatory about an axis parallel with the path of movement of the stock, two similar pairs of feed rolls mounted in said frame over such path, one pair on each side of the saw, each pair being rotatable about a common axis transverse to such path, and means for rotating the rolls of each pair located nearest said guide in a direction to advance the stock and the remaining rolls in the opposite direction to retract such stock, the first-named rolls being of larger diameter than the last-named, whereby the latter are retained out of contact with the stock until it has been fed past the former.

Signed by me, this 14 day of August, 1908.

HARRY J. HICK.

Attested by—
  H. H. EMMONS,
  D. SMELTZ.